(12) United States Patent
Hongchao (10) Patent No.: US 8,073,478 B2
(45) Date of Patent: Dec. 6, 2011

(54) MULTI-PARTY DIGITAL INTERCOMMUNICATION SYSTEMS AND ASSOCIATED METHODS OF OPERATION

(75) Inventor: Deng Hongchao, Beijing (CN)

(73) Assignee: Spreadtrum Communications, Inc., George Town, Grand Cayman (KY)

(*) Notice: Subject to any disclaimer, the term of this patent is extended or adjusted under 35 U.S.C. 154(b) by 1021 days.

(21) Appl. No.: 11/959,267

(22) Filed: Dec. 18, 2007

(65) Prior Publication Data

US 2009/0154679 A1   Jun. 18, 2009

(30) Foreign Application Priority Data

Dec. 19, 2006   (CN) .......................... 2006 1 0147461

(51) Int. Cl.
*H04M 3/42*   (2006.01)
*H04B 7/00*   (2006.01)
*H04W 4/00*   (2009.01)

(52) U.S. Cl. ......... 455/518; 455/519; 455/517; 455/416
(58) Field of Classification Search ................. 455/518, 455/517, 519, 416
See application file for complete search history.

(56) References Cited

U.S. PATENT DOCUMENTS

| | | | | |
|---|---|---|---|---|
| 5,485,635 A | * | 1/1996 | Paavonen ...................... | 370/347 |
| 5,901,363 A | * | 5/1999 | Toyryla ........................ | 455/527 |
| 6,754,196 B1 | * | 6/2004 | Daane et al. .................. | 370/338 |
| 7,664,517 B2 | * | 2/2010 | Ananthanarayanan et al. ............................. | 455/518 |
| 7,796,996 B2 | * | 9/2010 | Takano ......................... | 455/450 |
| 7,970,425 B2 | * | 6/2011 | Balachandran et al. ....... | 455/519 |
| 2003/0119536 A1 | * | 6/2003 | Hutchison ..................... | 455/517 |
| 2008/0200198 A1 | * | 8/2008 | Zhang ........................... | 455/518 |

* cited by examiner

*Primary Examiner* — Tilahun B Gesesse (57) ABSTRACT

This disclosure discloses methods and systems for subscribers in a multi-party conversation to obtain the right to speak efficiently and fairly.

8 Claims, 5 Drawing Sheets

MULTI-PARTY DIGITAL INTERCOMMUNICATION SYSTEMS AND ASSOCIATED METHODS OF OPERATION

CROSS-REFERENCE TO RELATED APPLICATION(S)

This application claims priority to Chinese Patent Application No. 200610147461.7, filed Dec. 19, 2007, the disclosure of which is incorporated herein by reference in its entirety.

TECHNICAL FIELD

The present disclosure is related to multiple access schemes of physical channels used during a multi-party conversation. In particular, the present disclosure is related to methods for controlling hand over of a right to speak in a multi-party conversation via digital intercommunication systems.

BACKGROUND

Digital intercommunication systems typically work in half-duplex mode and do not include a central control station when all subscribers are fully connected. When carrying out a multi-party conversation in half-duplex mode, at one time, no more than one transmitting subscriber has the right to speak and occupies the physical layer for transmitting voice signals.

In order to ensure that every subscriber has a chance to obtain the right to speak, a configuration is needed for handing over the right-to-speak among the multiple subscribers. Conventional intercommunication systems typically establish certain polling rules for handing over the right to speak, or leave to each subscriber to fight for the right to speak. Such arrangements can be inefficient.

When polling is used, a subscriber who wants to speak may have to wait for a long period of time before it is polled and given the right to speak. As a result, the communication efficiency may be decreased. When the subscribers are allowed to fight for the right to speak, collisions in the physical channel would occur if multiple subscribers want to obtain the right to speak. The back-off associated with such collisions can cause significant delay, and thus wasting precious physical channel resources. Thus, there is a need for improving the handing over of the right to speak among the multiple subscribers in a intercommunication system.

DETAILED DESCRIPTION

The following disclosure describes several embodiments of methods and systems for controlling handing over a right to speak in an intercommunication system. Several details describing well-known structures or processes often associated with digital intercommunication systems are not set forth in the following description for purposes of brevity and clarity. Also, several other embodiments of the invention can have different configurations, components, or procedures than those described in this section. A person of ordinary skill in the art, therefore, will accordingly understand that the invention may have other embodiments with additional elements, or the invention may have other embodiments without several of the elements shown and described below with reference to FIGS. 1-5.

In one embodiment, a digital intercommunication system is assigned to use the radio frequency band from 915.0125 to 916.9875 MHz. The digital intercommunication system can include a plurality of subscribers (e.g., cellular phones, walky-talkies, and/or other intercommunicating devices) connected in a network (e.g., a cellular phone network). The digital intercommunication system can also include intermediate relays (e.g., node B's) that facilitate the communication among the subscribers in the network. In one embodiment, the intercommunication system is configured as a interphone system. In other embodiments, the intercommunication system can be configured as an intercom and/or other communication systems.

A feasible scheme to divide the frequency resource is to equally allocate the assigned frequency band to 9 carriers with a 200 KHz frequency interval. Every carrier frequency interval is further divided into 8 time slots (with slot numbers from 0 to 7) with a frame length of 4.165 ms. The length of one time slot is 0.577 ms. Based on the foregoing frequency and time division, a combination of a carrier number and a time slot number can be used to represent a physical channel. For example, the physical channel (2, 5) represents time slot number 5 on carrier number 2. The center frequencies for all the carriers can be calculated as $915+0.2\times(n+1)$ MHz, where n is an integer from 0 to 8. For example, the frequency band of carrier 4 is 915.9-916.1 MHz, and its center frequency is 916 MHz. Therefore, the subscribers in the intercommunication system can access the system via time division multiple access (TDMA) and/or frequency division multiple access (FDMA).

The nine frequency bands in the digital intercommunication system can be divided into one control frequency band (e.g., band No. 8) and eight traffic frequency bands (band Nos. 0-7). Control frequency band can be used to transmit control information such as paging requests, paging acknowledgements, traffic types, etc. The traffic frequency bands can be used to transmit the user communication, e.g., speech, data, instructions, etc.

Figure 1:
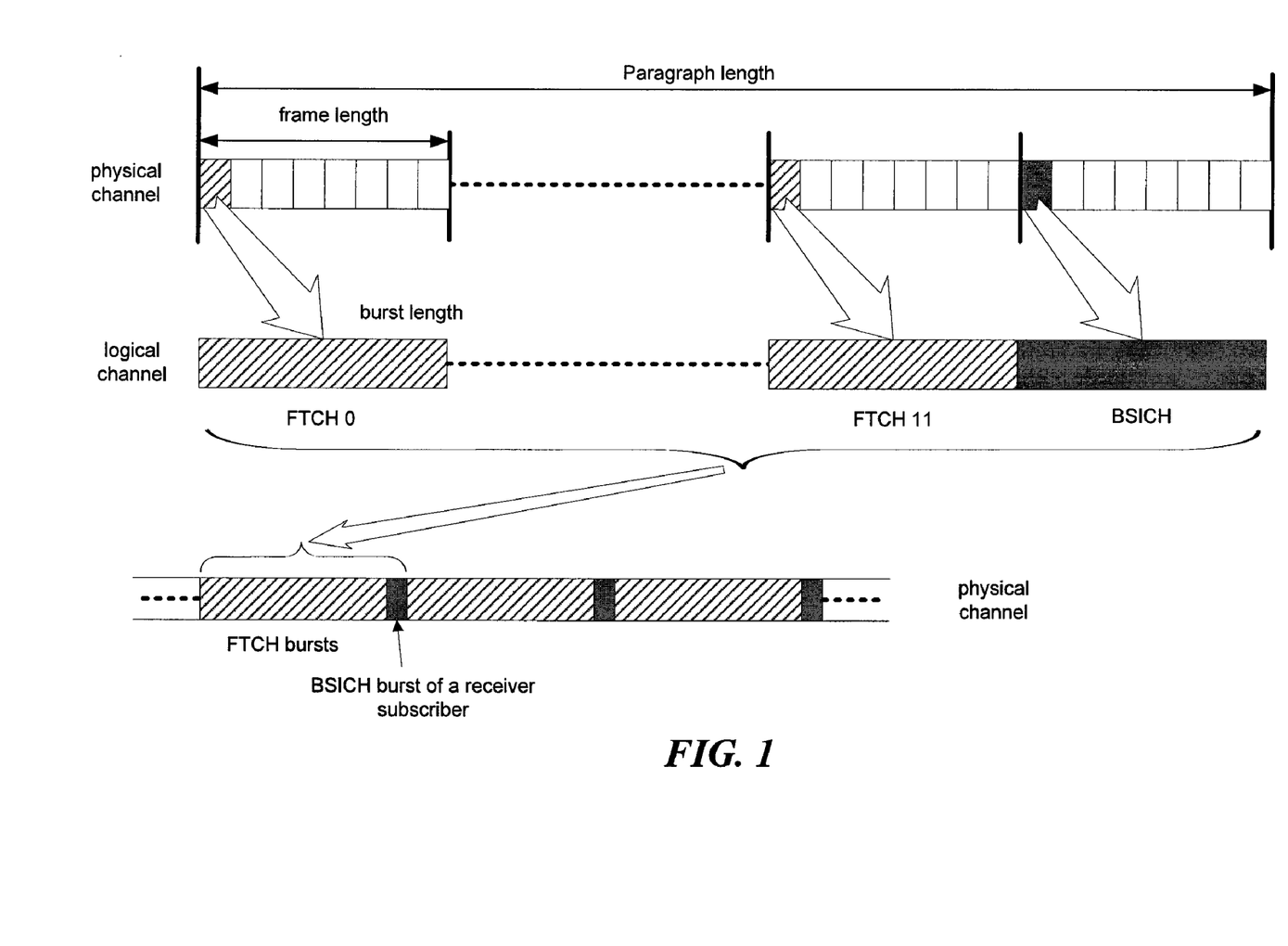
FIG. 1 is a schematic diagram illustrating Backwards Slow Instruction Channel (BSICH) and Forward Traffic Channel (FTCH) time division access to a physical channel in accordance with an embodiment of the invention.

In certain embodiments, three types of logical channels can be defined in the traffic frequency bands: a Forward Traffic Channel (FTCH), a Forward Fast Instruction Channel (FFICH), and a Backward Slow Instruction Channel (BSICH). These logical channels are mapped to the assigned frequency bands, as illustrated in FIG. 1. The FTCH is used to transmit speech and/or other data from/to the transmitting subscriber. For example, the speech and/or other data include speech that is encoded in 60 ms sections and transmitted in 12 TDMA bursts. The FFICH is used to transmit fast instruction information of the transmitting subscriber. When the transmitting subscriber needs to send via the FFICH, it occupies 4 continuous FTCH frames and causes the loss of 20 ms speech information. However, such speech information loss is believed to be unperceivable by human ears. The BSICH is used by a receiving subscriber to transmit information of slow instruction by, for example, inserting a BSICH frame after 12 TDMA frames for the FTCH. During multiple intercommunication, receiving subscribers use the BSICH according to certain sequences. Because there are 13 TDMA burst (4.615 ms×13=60 ms) in a 60 ms period, and every speech section with a length of 60 ms can be transmitted within 12 TDMA bursts, there are twelve forward FTCH bursts and one backward BSICH burst in every 60 ms. Thus, the FTCH and the BSICH can access the designated physical channels by, e.g., time division. When there are more than one receiving subscribers in a multi-party conversation, all receiving subscriber can send via the BSICH in turn via time division and/or other multiplexing schemes. In the foregoing description, the receiving subscriber generally refers to the subscriber that receives speech information carried by the FTCH and uses the BSICH to transmit slow instructions to the transmitting subscriber. The time division access relationship of FTCH and BSICH are illustrated in FIG. 1.

Figure 2:
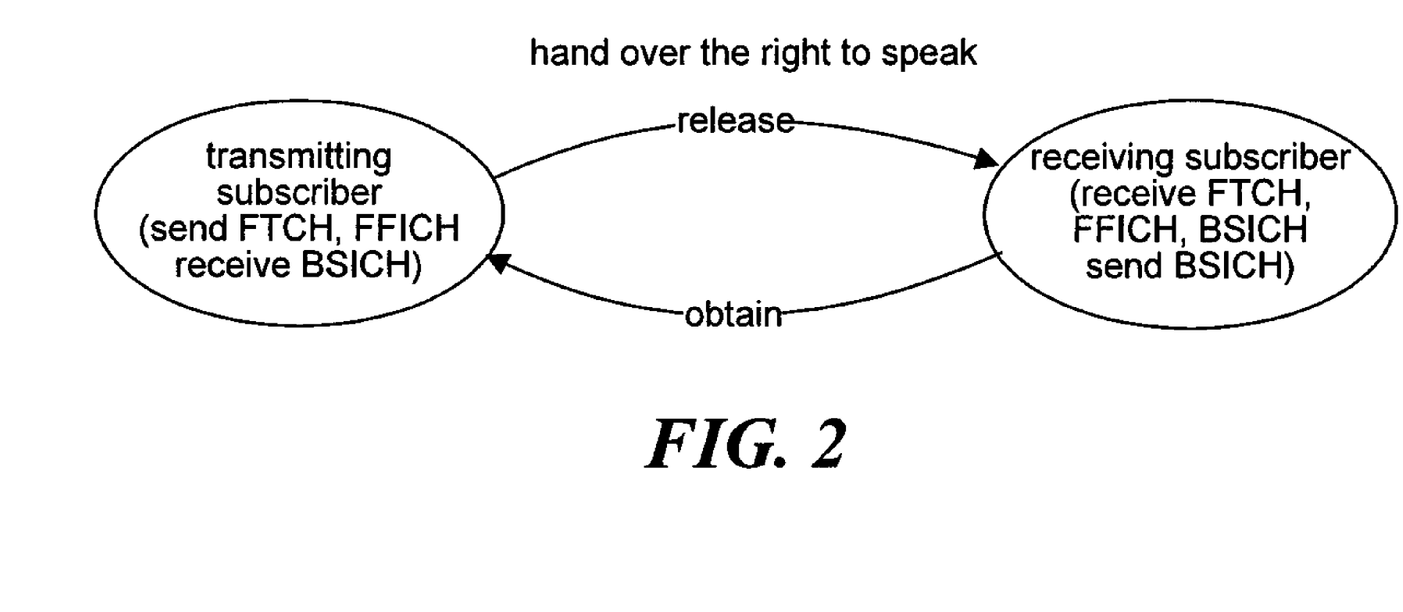
FIG. 2 is a schematic diagram illustrating handing over a right to speak between two subscribers in an intercommunication system in accordance with an embodiment of the invention.

Throughout the description, the following terms generally have the following meanings: (1) a right to speak: If a subscriber can use the FTCH to transmit speech information to others via the assigned physical channel, then the subscriber has the right to speak. (2) a transmitting subscriber: a subscriber that has the right to speak and thus can transmit via the FTCH and the FFICH to others and receive via the BSICH from receiving subscriber(s). (3) a receiving subscriber: a subscriber that does not have the right to speak. The receiving subscriber receives via the FTCH and the FFICH from a transmitting subscriber. The receiving subscriber also receives information via BSICH from other receiving subscriber(s) and transmits information to others via the BSICH in turn. (4) a round: a period of time that the right to speak is assigned to a transmitting subscriber and not handed over to others. For example, subscriber A, B and C are in a multi-party conversation, and the period of time that subscriber A is a transmitting subscriber is a round. If subscriber A hands over the right to speak to subscriber B, the period of time subscriber B is a transmitting subscriber is another round. (5) to hand over the right to speak: when a transmitting subscriber hands over the right to speak to a receiving subscriber, the transmitting subscriber becomes a receiving subscriber itself. The receiving subscriber to which the right to speak is handed to becomes a new transmitting subscriber. As illustrated in FIG. 2, the transmitting subscriber loses the right to speak after handing over the right to speak and becomes a receiving subscriber. Meanwhile, the receiving subscriber that obtains the right to speak becomes a new transmitting subscriber of the multi-party conversation. The transmitting subscriber can transmit via the FTCH and the FFICH and receive via the BSICH from the receiving subscriber. The receiving subscriber can transmit via the BSICH, receive via the FTCH and the FFICH, and receive via the BSICH from other receiving subscriber(s) (not shown).

Figure 3:
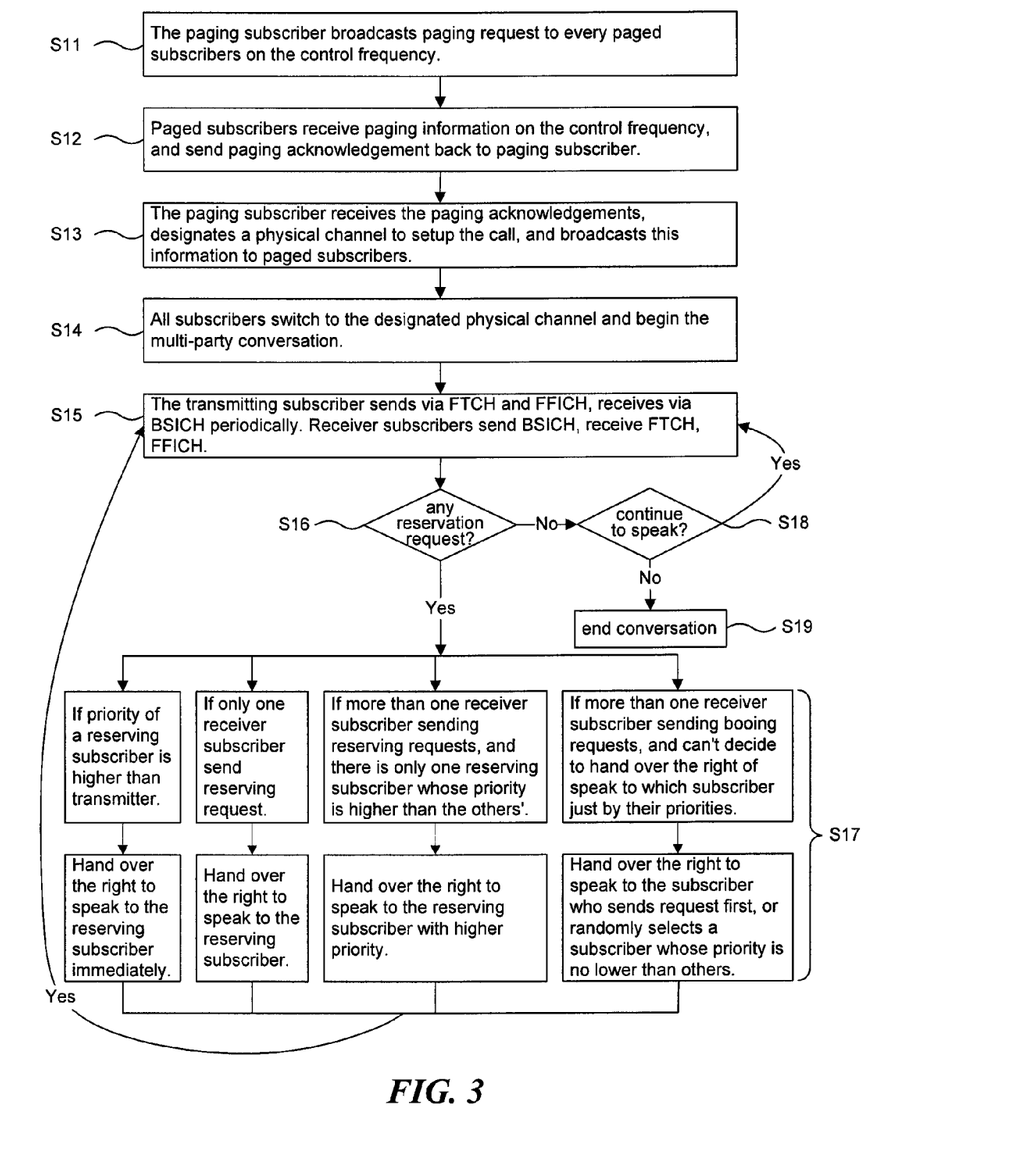
FIG. 3 is a flowchart of a method of handing over a right to speak in an intercommunication system in accordance with an embodiment of the invention.

FIG. 3 illustrates one embodiment of a method for handing over the right to speak in a multi-party conversation.

Operation S11: A paging subscriber broadcasts a paging request to other subscribers on the control frequency band. The paging request can include identification numbers and priority definition information of all the subscribers in the multi-party conversation. Synchronization, physical channel assignment and/or other control information can also be included in the paging request.

Operation S12: Each paged subscriber monitors the corresponding paging request on the control frequency band. After processing the received paging request, each paged subscriber sends a paging acknowledgement to the paging subscriber on the control frequency band. The paging acknowledgement can include a measurement report of traffic frequency bands, speak priority acknowledgement, and receiving signal quality, and/or other communication information.

Operation S13: After receiving the paging acknowledgement form each paged subscriber, the paging subscriber identifies all the subscribers who want to participate in the multi-party conversation, designates certain time slot in a physical channel for the conversation based on the receiving signal quality reports of each paged subscriber, and broadcasts this information to the participating subscribers.

Operation S14: After call setup process indicated in Operations S11-S13, all subscribers switch to the physical channel designated in S13 and begin the multi-party conversation.

Operation S15: The paging subscriber speaks as the transmitting subscriber first, and all the paged subscribers are receiving subscribers. The transmitting subscriber encodes speech and transmits the encoded speech via the FTCH.

Operation S16: During a pulse during the FTCH transmission of the transmitting subscriber, the paged subscribers sequentially occupies the physical channel as receiving subscribers and broadcast via the BSICH to the other subscribers. Those receiving subscribers that want to speak can reserve the right to speak from the transmitting terminal via the BSICH. In certain embodiments, if a particular receiving subscriber recognizes that other receiving subscribers with a higher priority are reserving the right to speak, then this receiving subscriber stops the reservation request.

Operation S17: The transmitting subscriber monitors the BSICH during transmission and determines how and when to hand over the right to speak based on the received reservation requests and its own priority level. a) If a receiving subscriber sends a reservation request for the right to speak and its priority is higher than that of the transmitting subscriber, then the transmitting subscriber stops speaking immediately and hands over the right to speak to the reserving subscriber and broadcasts via the FFICH to indicate the hand over. b) If there is only one receiving subscriber sending a reservation request for the right to speak and its priority is not higher than that of the transmitting subscriber, then after finishing speech, the transmitting subscriber hands over the right to speak to the reserving subscriber and broadcasts via the FFICH to indicate the hand over. c) If there are more than one receiving subscribers sending reservation requests for the right to speak, and among the reserving subscribers there is only one subscriber having a priority level higher than those of the others, then after finishing speech, the transmitting subscriber hands over the right to speak to the reserving subscriber with the higher priority level and broadcasts via the FFICH to indicate the hand over. d) If there are more than one receiving subscribers sending via the BSICH to request for the right to speak, and the transmitting subscriber cannot decide how to hand over the right to speak to any of the receiving subscribers based on their priorities, then after finishing speaking, the transmitting subscriber chooses the receiving subscriber that sends out the reservation request first or randomly chooses a receiving subscriber among the reserving subscribers having a priority level not lower than those of the others to hand over the right to speak, and broadcasts via the FFICH to declare the hand over.

Operation S18: A determination is then made to decide whether there are any receiving subscribers are attempting to reserve the right to speak. If yes, the process reverts to Operation S16; otherwise the process continues to Operation S19.

Operation S19: The transmitting subscriber stops transmitting information after finishing its speech, releases the physical channel, and the multi-party conversation ends.

Figure 4:
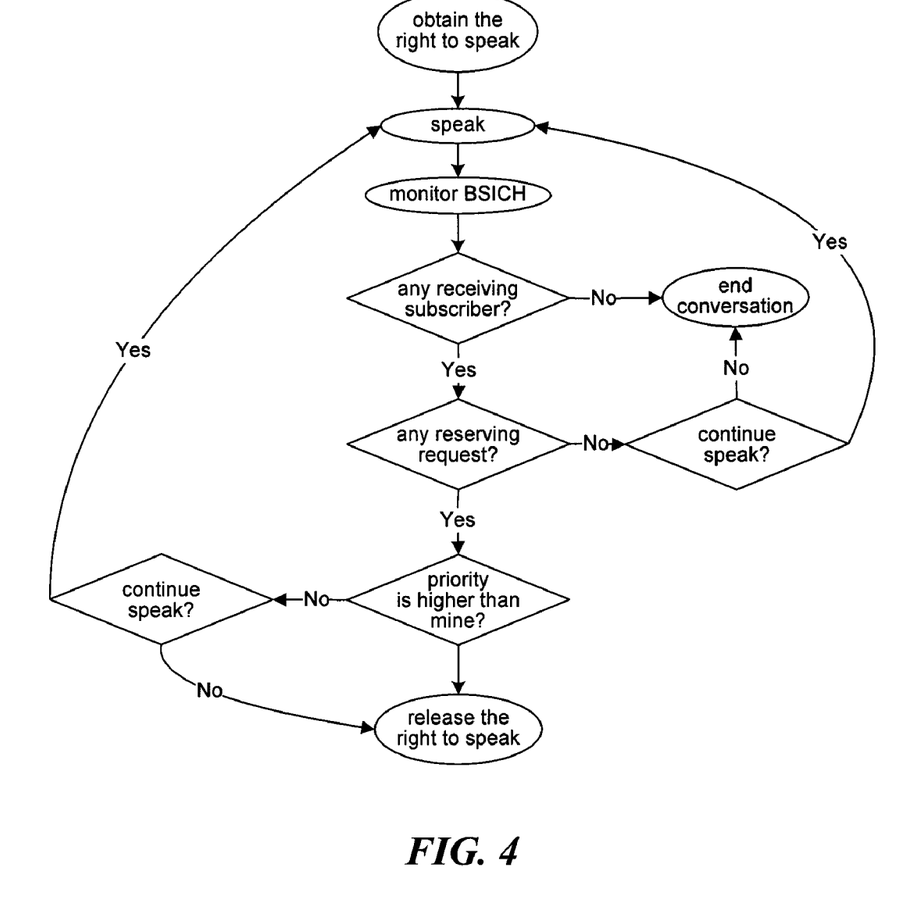
FIG. 4 is a flowchart illustrating a method of handing over a right to speak for a transmitting subscriber in an intercommunication system in accordance with an embodiment of the invention.
Figure 5:
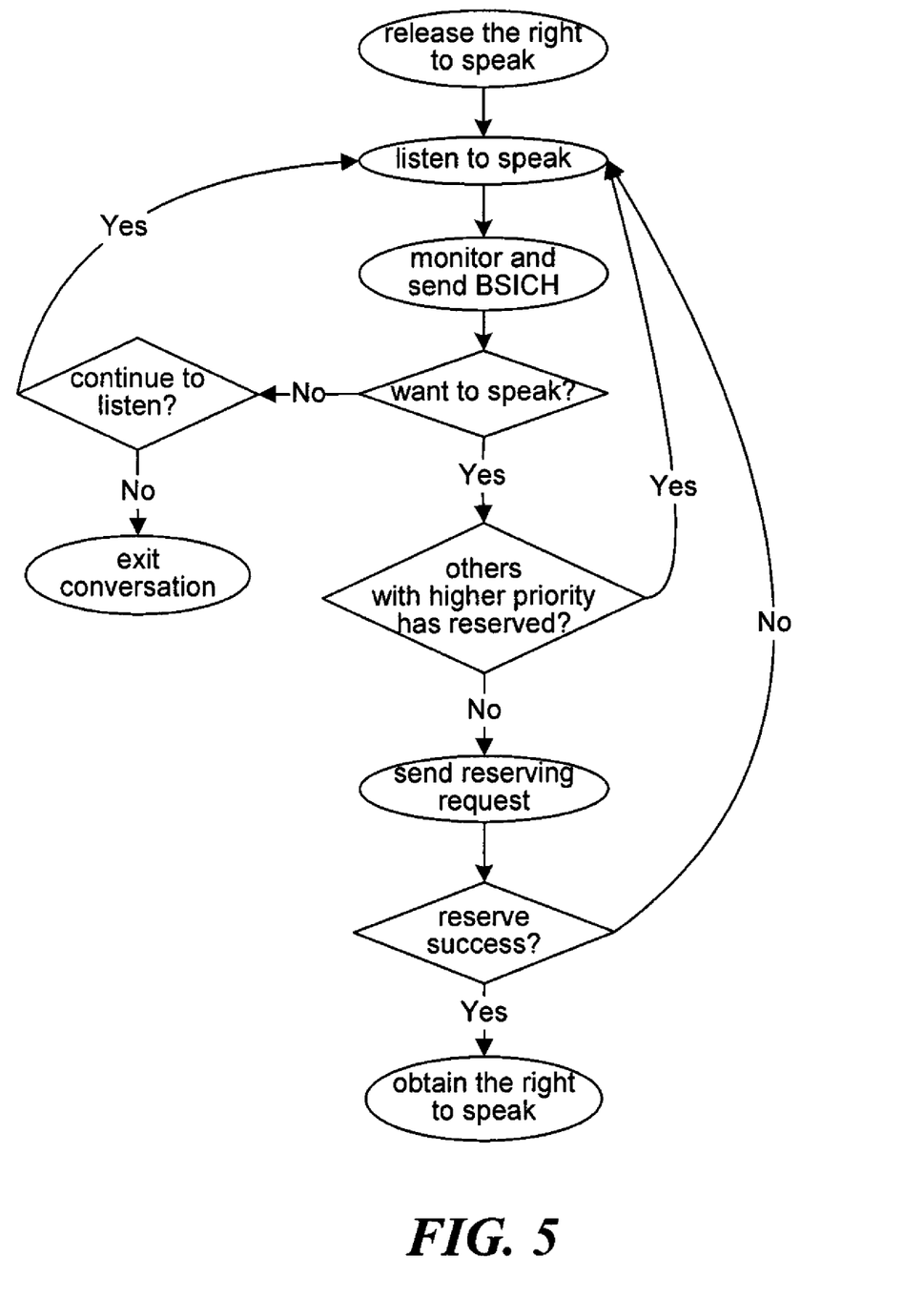
FIG. 5 is the flowchart illustrating a method of handing over a right to speak for a receiving subscriber in a digital intercommunication system in accordance with an embodiment of the invention.

FIGS. 4 and 5 are flowcharts illustrating methods of handing over a right to speak for a transmitting subscriber and a receiving subscriber in a digital intercommunication system, respectively, in accordance with embodiments of the invention.

As shown in FIG. 4, the method includes the following operations:

Operation S21: A subscriber obtains the right to speak and becomes the transmitting subscriber.

Operation S22: The transmitting subscriber speaks.

Operation S23: The transmitting subscriber monitors the BSICH.

Operation S24: The transmitting subscriber determines whether any receiving subscribers exist. If yes, the process proceeds to Operation S25; otherwise, the conversation is terminated, and the procedure ends.

Operation S25: The transmitting subscriber determines whether any receiving subscriber has sent reservation requests for the right to speak. If so, the process proceeds to Operation S26; otherwise, the process proceeds to Operation S28.

Operation S26: The transmitting subscriber determines whether the reserving subscriber has a higher priority than the transmitting subscriber. If yes, the transmitting subscriber hands over the right to speak to the reserving subscriber immediately. As a result, the transmitting subscriber becomes a receiving subscriber, and the reserving subscriber becomes a new transmitting subscriber. Otherwise, if the priority of the reserving subscriber is not higher than that of the transmitting subscriber, the process proceeds to Operation S27.

Operation S27: The transmitting subscriber determines whether the transmitting subscriber continues to speak. If yes, the process reverts to Operation S22; otherwise, the transmitting subscriber hands over the right to speak to the reserving subscriber.

Operation S28: The transmitting subscriber determines whether to continue speaking. If yes, the process reverts to Operation S22; otherwise, the transmitting subscriber hands over the right to speak to the reserving subscriber.

As shown in FIG. 5, the method includes the following operations:

Operation S31: The transmitting subscriber hands over the right to speak and becomes a receiving subscriber.

Operation S32: The receiving subscriber receives speech and/or control information via the FTCH and the FFICH from the transmitting subscriber.

Operation S33: The receiving subscriber periodically sends information via the BSICH at certain time slots and also receives information via the BSICH sent by other receiving subscriber(s).

Operation S34: If the receiving subscriber wants to speak, the process proceeds to S36; otherwise, the process proceeds to S35.

Operation S35: The receiving subscriber determines whether continue to listen to the multi-party conversation. If yes, the process proceeds to S32; otherwise, the receiving subscriber terminates the conversation, and the process ends.

Operation S36: The receiving subscriber determines whether there is any other receiving subscribers with a higher priority level attempting to reserve the right to speak. If yes, the process reverts to S32; otherwise, the process proceeds to S37.

Operation S37: The receiving subscriber transmits a reservation request via the BSICH to the transmitting subscriber.

Operation S38: The receiving subscriber determines whether the reservation is successful. If yes, the right to speak is obtained, and the process ends; otherwise, the process reverts to S32.

An example is given below to demonstrate the reservation scheme described above according to several embodiments of the present invention.

In this example, subscriber A pages subscribers B, C, D, E, F, G, and H to setup a multi-party conversation. All subscribers in the group can communicate to each other by a single hop except for subscriber I because subscriber I is out of range. Four levels of speak priority are defined as an example with descending sequence: priority 00, 01, 10 and 11. Priority 00 is the highest and 11 is the lowest.

In operation, subscriber A broadcasts a paging request to subscribers B, C, D, E, F, G, H and I to setup a multi-party conversation on the control frequency band. In the paging request, the priorities for every subscribers in this conversation are defined as below as an example:

| A | B | C | D | E | F | G | H | I |
|---|---|---|---|---|---|---|---|---|
| 10 | 10 | 10 | 11 | 11 | 11 | 11 | 11 | 11 |

After receiving the paging request, the paged subscribers send paging acknowledgement one by one to paging subscriber A on the control frequency band. The paging acknowledgement include, for example, traffic frequency band measurements, signal strength indications, acknowledgement of the priority definition, and/or other communication information.

The paging subscriber receives the paging acknowledgements and identifies that subscribers B, C, D, E, F, G and H would join the multi-party conversation while subscriber I is out of range. Paging subscriber A selects a time slot on a traffic frequency band as the designated physical channel for this multi-party conversation based on, e.g., the traffic frequency band measurement contained in the paging acknowledgements. Paging subscriber A then broadcasts via the FFICH to notice other subscribers to switch to the designated physical channel. The call setup is complete. All subscribers that join this multi-party conversation switch to the designated physical channel to start the multi-party conversation.

Subscriber A obtains the right to speak first and speaks to others on the designated physical channel. As a result, subscriber A is the transmitting subscriber, and others are receiving subscribers in this round. Transmitting subscriber A broadcasts via the FTCH and the FFICH to others. Receiving subscribers B, C, D, E, F, G, H receive via the FTCH and the FFICH information broadcasted by the transmitting subscriber, and send information to the transmitting subscriber and the other receiving subscribers via the BSICH. The reservation request of the right to speak can be sent via the BSICH. In certain embodiments, one thirteenth of the total time resource on the designated physical channel is used for the BSICH. After the transmitting subscriber sends every twelve burst, there is a time slot provided to a certain receiving subscriber to send via the BSICH. If a receiving subscriber does not send via the BSICH on its turn, others would perceive that it has exited the multi-party conversation.

Assuming both subscriber C and E send reservation requests for the right to speak while subscriber A is speaking, subscriber A does not release the right to speak until subscriber A finishes the speak because the priority of both subscriber C (priority '10') and E (priority '11') is not higher than the priority of subscriber A (priority '10'). Because the priority of subscriber C is higher than that of subscriber E, after subscriber A finishes speaking, subscriber A hands over the right to speak to subscriber C.

Having obtained the right to speak, subscriber C becomes the transmitting subscriber, and subscriber A becomes a receiving subscriber of this round. When transmitting subscriber C is speaking, if there is no communication sent by subscriber D via the BSICH, subscriber D is believed to have exited the multi-party conversation.

Assuming that subscribers A, B, E and F all send reservation requests for the right to speak, the priority of subscriber A ('10') and B ('10') is the same and higher than the priorities of E ('11') and F ('11'). Thus, after subscriber C finishes speaking, subscriber C can randomly select a subscriber from subscriber A and B or just choose the one that sends the reservation request first.

Assuming subscriber B obtains the right to speak, subscriber B becomes the transmitting subscriber for this round. Assuming that both subscribers E (priority '11') and G (priority '11') send reservation requests for the right to speak, after subscriber B finishes speaking, subscriber B can randomly choose a subscriber from subscriber E and G or just choose the one that sends the reservation request first.

Assuming subscriber E obtains the right to speak, subscriber E becomes the transmitting subscriber for this round. Assuming that subscriber A sends a reservation request for the right to speak, because the priority of subscriber A ('10') is higher than that of subscriber E ('11'), subscriber E stops speaking immediately and hands over the right to speak to subscriber A.

Having obtained the right to speak, subscriber A becomes the transmitting subscriber again for a new round. Assuming that only subscriber G sends a reservation request for the right to speak, then after subscriber A finishes speaking, subscriber A hands over the right to speak to subscriber G.

Having obtained the right to speak, subscriber G becomes the transmitting subscriber for another round. Assuming that all receiving subscribers have exited the multi-party conversation and the transmitting subscriber can't detect any traffic on the BSICH in the assigned physical channel, then subscriber G stops speaking and releases the physical channel. The multi-party conversation ends.

One feature of the methods described above include defining a speak priority of all the subscribers in a multi-party conversation during call setup. Thus, different subscribers are assigned different priority levels. During the conversation, all receiving subscribers use the BSICH to reserve the right to speak. In certain embodiments, pressing certain buttons on a device of a receiving subscriber sends of reservation request to the transmitting subscriber via the BSICH. After one round of conversation, the current transmitting subscriber determines which receiving subscriber becomes the transmitting subscriber of the next round according to the reservation requests sent by the receiving subscribers. The receiving subscriber whose priority is higher than that of the transmitting subscriber can obtain the right to speak immediately by sending a request via the BSICH. As such, the speak priority and the reservation technique via the BSICH enable each receiving subscriber to obtain the right to speak fairly and efficiently to reduce the risk of collision.

From the foregoing, it will be appreciated that specific embodiments of the invention have been described herein for purposes of illustration, but that various modifications may be made without deviating from the invention. Many of the elements of one embodiment may be combined with other embodiments in addition or in lieu of the elements of the other embodiments. Accordingly, the invention is not limited except as by the appended claims.

I claim:

1. A method for handing over a right to speak of in a multi-party conversation in a digital intercommunication system, comprising of:
   (1) broadcasting a paging request from a paging subscriber to other subscribers on a control frequency of the digital intercommunication system, the paging request including priority definition information;
   (2) detecting the paging request by the paged subscribers on the control frequency and in response, sending paging acknowledgement to the paging subscriber on the control frequency, the paging acknowledgement including a measurement report of traffic frequency bands, subscriber priority acknowledgement, and receiving signal quality;
   (3) receiving the paging acknowledgement, selecting a time slot on a traffic frequency band as a designated physical channel to setup the call, and broadcasting the selected time slot to the paged subscribers;
   (4) after call setup, beginning the multi-party conversation via the designated physical channel with the paging subscriber being a transmitting subscriber;
   (5) broadcasting encoded speech or data from the transmitting subscriber to the other subscribers via a Forward Traffic Channel (FTCH) and via a Forwards Fast Instruction Channel (FFICH);
   (6) broadcasting a reservation request via a Backward Slow Instruction Channel (BSICH) from one of the other subscribers to the transmitting subscriber to reserve the right to speak;
   (7) monitoring the BSICH at the transmitting subscriber and determining whether to hand over the right to speak according to the received reservation request;
   (8) if there is a hand over of the right to speak, repeating operations (6) and (7); if there is reservation request received at the transmitting subscriber, stopping sending messages from the transmitting subscriber, releasing the designated physical channel and terminating the multi-party conversation.

2. The method of claim 1 wherein the above-mentioned Operation (6) can further include: if a subscriber detects that another subscriber with a higher priority has sent a reservation request for the right to speak, the subscriber stops sending the reservation request.

3. The method of claim 1 wherein Operation 7 can further include:
   a) If there is a subscriber whose priority is higher than the transmitting subscriber, the transmitting subscriber stops speaking immediately, hands over the right to speak to the reserving subscriber, and broadcasting via the FFICH to indicate the hand over;
   b) If there is only one receiving subscriber sending a reservation request for the right to speak and the receiving subscriber has a priority no higher than that of the transmitting subscriber, the transmitting subscriber hands over the right to speak to the reserving subscriber and broadcasting a FFICH to declare the hand over after finishing transmitting;

c) If there is more than one receiving subscriber sending a reservation request for the right to speak, and among the reserving subscribers there is only one subscriber whose priority is higher than those of the others, the transmitting subscriber hands over the right to speak to the reserving subscriber with the higher priority and broadcasting via the FFICH to indicate the hand over;

d) If there is more than one receiving subscriber sending reservation requests via the BSICH for the right to speak, and the transmitting subscriber cannot decide whether to hand over the right to speak based on priority, the transmitting subscriber chooses the subscriber that sends the reservation request first or randomly chooses a subscriber whose priority is not lower than others to hand over the right to speak, and broadcasting via the FFICH to indicate the hand over.

4. The method of claim 1 wherein Operation (1) of the paging request includes identification numbers of the paged subscribers, synchronization information, and a definition of priorities.

5. The method of claim 1 wherein the paging acknowledgement includes a traffic frequency band measurement, a receiving signal strength, and an acknowledgement of priority definition.

6. The method of claim 1 wherein the FTCH, the BSICH, and the FFICH are logical channels defined on the traffic frequency bands, and the FFICH is configured to carry fast instruction information of the transmitting subscriber, and the BSICH is configured to carry the backward slow instruction messages of the receiving subscriber.

7. The method of claim 1 wherein the control frequency is configured to transport the paging request and the paging acknowledgement, and the traffic frequency bands are configured to transport encoded speech or data.

8. The method of claim 1 wherein the multi-party conversation includes a frequency resource allocation scheme in which a frequency band from 915.0125 to 916.9875 MHz is equally assigned to nine carriers with a 200 KHz frequency interval, and a frame for one of the nine carriers is equally divide into 8 time slots with a length of 4.165 ms.

* * * * *